US009094907B2

(12) United States Patent
Xing et al.

(10) Patent No.: US 9,094,907 B2
(45) Date of Patent: Jul. 28, 2015

(54) HIGH-PRECISION TIME TAGGING FOR CONTENT SYNTHESIZATION

(71) Applicant: TELEFONAKTIEBOLAGET L M ERICSSON (PUBL), Stockholm (SE)

(72) Inventors: Bo Xing, Fremont, CA (US); Yi-Pin Eric Wang, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 164 days.

(21) Appl. No.: 13/764,506

(22) Filed: Feb. 11, 2013

(65) Prior Publication Data

US 2014/0226648 A1    Aug. 14, 2014

(51) Int. Cl.
*H04W 56/00*    (2009.01)
*H04W 84/18*    (2009.01)

(52) U.S. Cl.
CPC .......... *H04W 56/001* (2013.01); *H04W 56/009* (2013.01); *H04W 84/18* (2013.01)

(58) Field of Classification Search
CPC .... H04W 56/00; H04W 56/001; H04W 84/18
USPC ......................................... 370/310, 345, 350
See application file for complete search history.

(56) References Cited

U.S. PATENT DOCUMENTS

| 6,665,541 | B1 * | 12/2003 | Krasner et al. ................ 455/502 |
| 6,715,354 | B2 | 4/2004 | Wooh | |
| 6,854,333 | B2 | 2/2005 | Wooh | |
| 7,411,970 | B2 * | 8/2008 | Scott et al. .................... 370/419 |
| 7,613,212 | B1 * | 11/2009 | Raz et al. ...................... 370/510 |
| 7,664,057 | B1 * | 2/2010 | Wu et al. ....................... 370/260 |
| 7,778,166 | B2 * | 8/2010 | Dewan et al. ................. 370/229 |
| 8,279,897 | B2 * | 10/2012 | Lee et al. ....................... 370/503 |
| 2004/0213295 | A1 * | 10/2004 | Fehr .............................. 370/503 |
| 2006/0187026 | A1 * | 8/2006 | Kochis ..................... 340/539.13 |
| 2008/0068262 | A1 * | 3/2008 | Loomis .................... 342/357.09 |

(Continued)

FOREIGN PATENT DOCUMENTS

EP    2219321    8/2010
EP    2378822    10/2011

(Continued)

OTHER PUBLICATIONS

Bhatia, M., et al., "IS-IS Generica Cryptographic Authentication", *RFC 5310*; Feb. 2009; 12 pages.

(Continued)

*Primary Examiner* — Chi H Pham
*Assistant Examiner* — Robert Lopata
(74) *Attorney, Agent, or Firm* — Nicholson De Vos Webster & Elliott, LLP

(57) ABSTRACT

A method is implemented by a sensor device to associate data collected by the sensor device with an accurate time according to a world time standard without having to include a dedicated timing device within the sensor device, thereby reducing the cost and complexity of the sensor device. The method includes initiating a cellular receiver in the sensor device using a programmed carrier frequency, receiving at least one radio frame from a cellular transmitter on the carrier frequency; tagging data collected by the sensor device with a network tag derived from a most recent radio frame of the at least one radio frame in real-time, the network tag including a set of data from the most recent radio frame that is unique to the most recent radio frame.

14 Claims, 5 Drawing Sheets

(56) References Cited

U.S. PATENT DOCUMENTS

| | | | |
|---|---|---|---|
| 2008/0097754 A1* | 4/2008 | Goto et al. | 704/214 |
| 2011/0216660 A1* | 9/2011 | Lee et al. | 370/252 |
| 2012/0089474 A1* | 4/2012 | Xiao et al. | 705/26.4 |
| 2012/0287918 A1* | 11/2012 | Abraham et al. | 370/350 |
| 2014/0032449 A1* | 1/2014 | Kacin et al. | 706/12 |

FOREIGN PATENT DOCUMENTS

| | | | |
|---|---|---|---|
| EP | 2530860 A1 | * | 12/2012 |
| KR | 100819037 | | 4/2008 |
| WO | WO-2006046015 | | 5/2006 |

OTHER PUBLICATIONS

Callon, R., et al., "Use of OSI IS-IS for routing in TCP/IP and Dual Environments", *RFC 1195*; Dec. 1990; http://tools.ietf.org/rfc/rfc1195.txt; 80 pages.

Chunduri, U., et al., "KARP IS-IS Security Gap Analysis draft-chunduri-karp-is-is-gap-analysis-03", Oct. 12, 2012; 13 pages.

Hartman, S., et al., "Multicast router Key Management Protocol draft-hartman-karp-mrkmp-05", Sep. 6, 2012; 27 pages.

Li, T., et al., "IS-IS Cryptographic Authentication", *RFC 5304*; Oct. 2008; 11 pages.

Tran, P., et al., "The Use of G-IKEv2 for Multicast Router Key Mangement draft-tran-karp-mrmp-02", Oct. 22, 2012; 13 pages.

* cited by examiner

HIGH-PRECISION TIME TAGGING FOR CONTENT SYNTHESIZATION

FIELD OF THE INVENTION

Embodiments of the invention are related to the field of time keeping in computer systems. Specifically, the embodiments relate to a method and system for low-cost time keeping in sensor devices.

BACKGROUND

Time keeping in computing systems requires information for synchronizing the time with a world time keeping standard and a mechanism for accurately maintaining the current time between synchronizations. Synchronization can be either an automated or manual process. The most basic manual process is the input of a current time or date by a user. This methodology requires that the user have access to accurate time and be capable of inputting this time accurately. A user may utilize time kept by another computing device or clock in their house or work place, where the accuracy of this time cannot be confirmed.

If a computing device has access to a network or similar communication medium, then it can be configured to synchronize automatically by communicating with a time keeping source. Most time keeping sources are maintaining and possibly broadcasting a time that is a standardized time such as International Atomic Time (TAI) or Universal Coordinated Time (UTC). These standardized times are well established standards for time keeping that are in wide use and each standard uses a precise methodology for determining the current time. The computing device can contact a server or listen for a broadcast of the current time according to one of these standards. As used herein, these standardized times are referred to as "world time standards" and a current value of one of these standards including a time and/or date is referred to as an "accurate time."

Once the accurate time is received by the computing device, the time keeping mechanism must be able to accurately maintain the time until a next synchronization, which in the case of a manual synchronization can be a significant amount of time. Most computing devices use oscillator circuits that update the time in fixed increments based on the frequency of the oscillation of the oscillator circuit. Oscillators vary widely, but provide reasonably accurate mechanisms for updating the time maintained by a computing device, but by themselves provide no mechanism for obtaining an accurate time or verifying that the value maintained by the computing device is accurate.

SUMMARY

A method is implemented by a sensor device to associate data collected by the sensor device with an accurate time according to a world time standard without having to include a dedicated timing device within the sensor device, thereby reducing the cost and complexity of the sensor device. The method includes initiating a cellular receiver in the sensor device using a programmed carrier frequency, receiving at least one radio frame from a cellular transmitter on the carrier frequency, and tagging data collected by the sensor device with a network tag derived from a most recent radio frame of the at least one radio frame in real-time, the network tag including a set of data from the most recent radio frame that is unique to the most recent radio frame.

A sensor device implements a process to associate data collected by the sensor device with an accurate time according to a world time standard without having to include a dedicated timing device within the sensor device, thereby reducing the cost and complexity of the sensor device. The sensor device includes a sensor to collect data, a cellular receiver configured to use a programmed carrier frequency and to receive at least one radio frame from a cellular transmitter on the carrier frequency, and a processor coupled to the sensor and the cellular receiver, the processor configured to tag data collected by the sensor with a network tag derived from a most recent radio frame of the at least one radio frame in real-time, the network tag including a set of data from the most recent radio frame that is unique to the most recent radio frame.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1A:
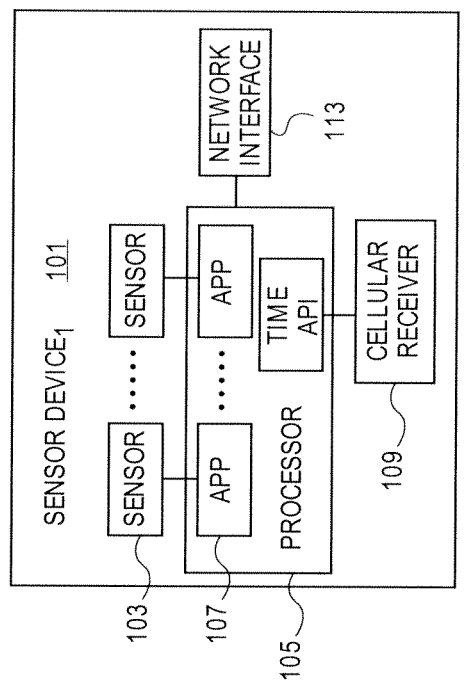
FIG. 1A is a diagram of one embodiment of an example sensor device implementing a precise time tagging system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., a sensor device, end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Embodiments of the invention provide a process and system that address the problem of accurately synthesizing content (i.e., information and media) that is generated by multiple devices or sensors. Many networked applications and services will involve a multitude of distributed devices and sensors that constantly collect data and generate content. For the content to be synthesized, the content needs to be tagged with time information that is fairly accurately synchronized. While a high degree of synchronization at devices and sensors oftentimes incurs a high cost, the embodiments solve the problem with a low-cost solution that achieves high precision, but does not even need devices and sensors to have specialized clocks and related circuitry.

The advantages of the embodiments of the invention include providing an accurate system and process for tagging data collected at sensor devices and similar types of data with an identifier (i.e., a network time tag) that enables correlation with a world standard time value and thereafter for content to be generated by synthesizing this collected data using the accurate word standard time values associated with the collected data. These benefits can be achieved without specialized clock circuitry and extra-communication equipment that would otherwise be required to automatically and accurately tag collected data with an accurate world time standard value.

The disadvantages of the prior art include use of specialized time keeping circuitry is required to maintain and synchronize the time kept by computing devices such as sensor devices that collect data. These devices are particularly designed to have low cost and high distribution such that even small increases in cost are undesirable. Reliably and accurately synchronizing time across a large set of such devices has required significant processing resources or specialized clock or synchronization circuitry that requires either more expensive processors or added circuitry that increases the cost of the computing devices.

Overview

It is anticipated that in the near future, over 50 billion electronic devices are to be connected (through various types of connectivity) to one another and to networks such as the Internet, this interconnected world and system is sometimes referred to as the "Networked Society." These electronic devices will be working collaboratively to accomplish certain tasks, for people and/or on behalf of people. A big portion of these electronic devices are sensor devices, i.e., devices that constantly collect ambient information or measurements (e.g., temperature, humidity, video, audio, and similar data.). The completion of these tasks is made possible by the collective power of the sensor devices that are deployed at different places. For this coordination to work, it is important that the sensor devices share the same view of time, for example by maintaining a similar current time value based on a world standard time. With that, the knowledge gained out of the content that can be derived from these sensor devices can be even more valuable.

While a shared view of time among sensor devices will be a common need of many applications and services, the degree of precision or accuracy needed will vary between applications. For example, in a public safety system that aims at detecting events by aggregating information from distributed video cameras, high precision is needed. In a crowd-sourced multimedia synthesis scenario, high precision is not required but is desired and will improve the quality of the generated content.

A special case in the 50 billion connected devices is smart phones and tablets, which are already connected to wide area networks including the Internet. Camera and audio/video recorders are integrated in these devices. The quality of these built-in recorders (i.e., sensors) has improved tremendously in recent years. Increasing numbers of people use their smart phones and tablets to take pictures and record video clips. As they continuously generate content of various forms (e.g., text, images, and videos), events in the physical world could be detected, recognized and analyzed through crowd-sourcing (i.e., synthesizing user-generated data from a group of devices controlled by different users, referred to as the "crowd"). This is what is referred to as crowd-sourced multimedia synthesis, where the synthesis of multimedia contents from multiple devices (e.g., taken at the same event) could benefit greatly from a shared view of time among those devices.

Many sensor devices include with their own clocks that work similarly as clocks on desktop computers and smartphones or tablets. The clocks on different sensor devices run independently, and therefore are not synchronized. This type of sensor device can be utilized in cases where each sensor devices does its own job independently (e.g., a thermometer measuring the temperature of a room), but does not suffice if a number of sensor devices must communicate and collaborate to fulfill certain tasks together (e.g., a collection of sensor devices tracking the traffic in a roadway or highway system).

For a group of closely located sensor devices to have synchronized clocks, there are ad-hoc mechanisms developed by the sensor device manufacturers and users. These ad-hoc mechanisms include synchronization protocols that are executed on all participating sensor devices, which communicate their clock time though local wireless ad-hoc links via radio-frequency (RF), Infrared (IR) and similar wireless communication technologies. Such synchronization aims at only keeping the same notion of time, but does not provide the sensor devices with an accurate time value according to a world time standard. Moreover, it is based on the assumption that the sensor devices are pre-programmed to work together.

In Networked Society scenarios, a multitude of devices/sensors that are not physically co-located work in collaboration. For their clocks to be synchronized according to a world time standard, more costly mechanisms would need to be used such as those mechanisms and processes that are being used on smart phones. A smart phone talks to a central entity that maintains a current value according to a world time standard. If connected to the Internet, a device acquires Coordinated Universal Time (UTC) through the Network Time Protocol (NTP). In theory, the accuracy of UTC is in the order of tens of milliseconds over the public Internet; however, in practice, the accuracy is in the order of hundreds of milliseconds or seconds. If not connected to the Internet, but instead connected to a cellular network, a device acquires time through the Network Identity and Time Zone (NITZ) protocol (optionally implemented for the provisioning of local time and date information). The accuracy of NITZ, however, is in the order of minutes. An even more expensive mechanism is to acquire time though a global positioning system (GPS) receiver on a device, if the device includes such a receiver, which is both costly and power draining.

Such time synchronization processes are viable in the context of smart phones, which are expensive and have regular charging schedules as well as powerful processors. But these resources are not available and quite costly in the context of sensor devices that are intended to be low-cost and less battery-hungry (i.e., less power consuming). Even with the existing mechanisms on smart phones, the accuracy of the time acquired might not be sufficient in some cases where sensor devices are utilized.

In an example use case scenario, after a user uses a smart phone to obtain a video clip about a live event (e.g., a child's soccer game or music recital), the user may upload the video clip and share the link with friends. Often people find themselves having access to multiple video clips capturing the exact same moment or exact same sequence of actions, because multiple people in the same social network attended the same event and recorded audio/video at the same time. However, it is hard (if not impossible) to synthesize a multi-angle video clip using the multiple video clips available. One main reason is that the video clips are tagged with time information that is not synchronized to the degree needed.

The embodiments provide a different approach to achieving a shared view of time across sensor devices and similar electronic devices. In contrast to other possible solutions that synchronize clocks, the embodiments do not need the presence of specialized clock circuits on the sensor devices. As opposed to paying the cost of clock synchronization at the sensor devices when data is collected or similar content is being generated, the embodiments shift the cost-paying moment and location to the point when and location where content is synthesized (if needed). The cost is thus paid at a cloud service, not at the sensor devices, which is more cost effective.

The embodiments work by (1) enabling sensor devices in hardware to have quick and low-cost access to the high-precision time related information maintained by a radio access network; (2) making available the information acquired from the physical layer of the mobile network to applications running on sensors/devices; (3) tagging the contents generated by the applications with the time information acquired from the network, and (4) creating a cloud service that exposes absolute timestamps based on world time standards to facilitate synthesis of temporally relevant content generated by multiple sensor devices.

Precision Time Information from Radio Access Networks

Figure 5:
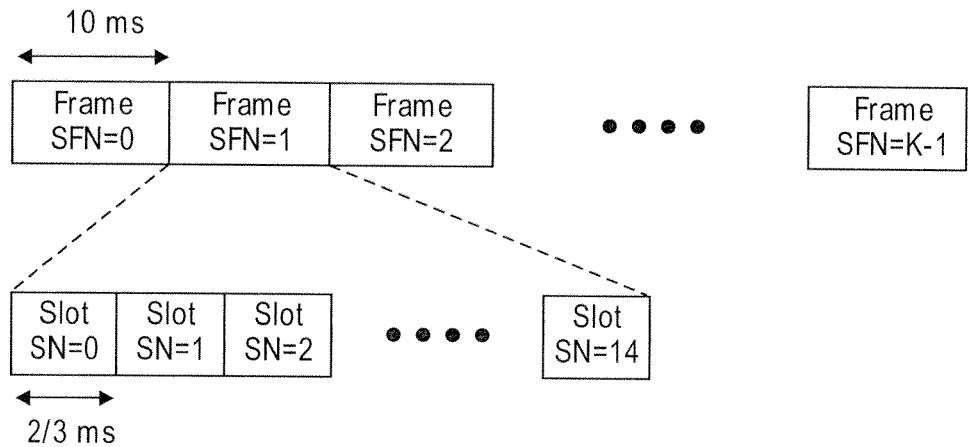
FIG. 5 is a diagram of a wideband code division multiple access frame.
Figure 6:
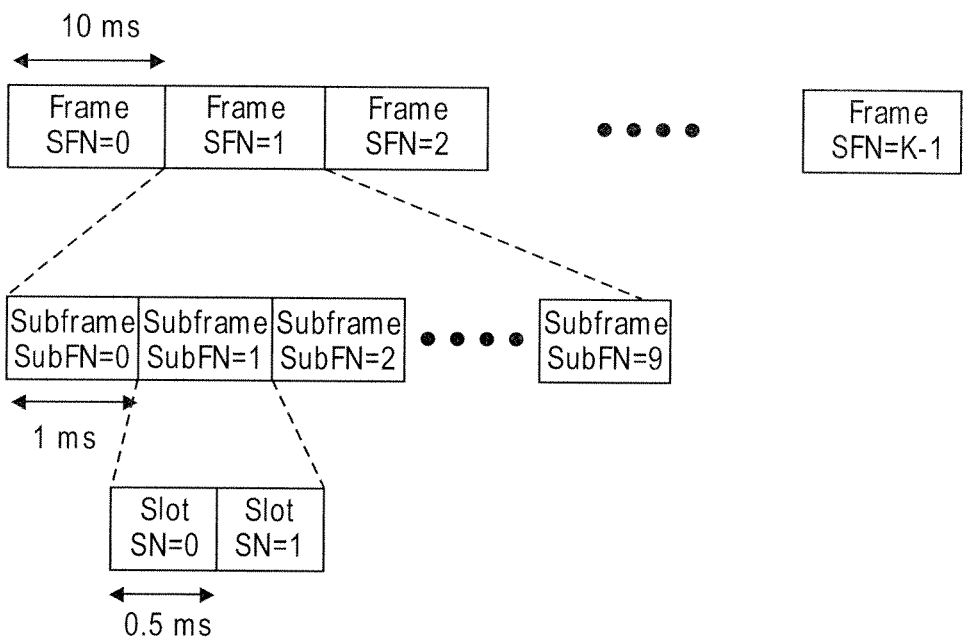
FIG. 6 is a long term evolution frame.

The embodiments are built upon the high-precision time information that is available from the physical layer of a Radio Access Network (RAN) utilized by cellular phone networks. This time information is much more accurate than NTP and NITZ. It is also more accessible, and less costly to access due to its wide availability and the inexpensiveness of cellular receivers. The physical layer of any cellular network has a framing structure. For example, wideband code division multiple access (WCDMA) uses 10-ms frames, each of which is divided into 15 slots (see FIG. 5). Each WCDMA slot is thus 0.67 ms long. Long Term Evolution (LTE) networks have a similar, though somewhat different, physical layer framing structure shown in FIG. 6. Each LTE slot is 0.5 ms long.

In the framing structure of a cellular network, each radio frame is associated with a System Frame Number (SFN). The combination of two or more of SFN, Sub-Frame Number (SubFN), and Slot Number (SN) indicates a very accurate time stamp that is at the precision of the sub-millisecond level. For example, with WCDMA the use of SFN and the SN is sufficient to accurately time stamp each frame. This network information combination is referred to herein as a network tag that can be used to identify indirectly a particular time. Although the difference in propagation delays may result in slight inaccuracy, this discrepancy is extremely small. For example, a 1-Km difference in distance between a device and a cell tower introduces a 3.33 ms difference in propagation delay, which is a significant improvement in accuracy over the other methods discussed above.

In some cellular networks, all cells share the same SFN sequence; whereas in some other networks, cells maintain independent SFN sequences. In both cases, the operator is capable of tracking and maintaining the accurate world standard time that an SFN corresponds to, given the ID of the cell tower that the SFN is heard from. For example, the accurate time can be obtained using the GPS time stamp and the relationship between an SFN and a GPS time stamp can be maintained for each cell in the network.

FIG. 1A is a diagram of one embodiment of a sensor device implementing the precision time tagging. The sensor device 101 can include a cellular receiver 109. This cellular receiver 109 can be a low-cost cellular receiver that is embedded in the sensor device 101. A transmitter need not be included; the cost could be even lower if the cellular receiver only performs synchronization and tagging using SFN and/or the other values derived from the received signal. The cellular receiver 109 can have the frequency band and carrier frequency information hardcoded with a single configuration preprogrammed or any combination of configurations pre-programmed that the processor 105 can iterate through to identify a carrier band to hear. The cellular receiver 109 starts up by tuning to the pre-programmed frequency and thereafter keeps listening to the radio frames on that frequency.

The sensor device 101 can include a processor 105 or similar circuitry to implement the applications 107 that monitor and report sensor data collected by the sensors 103. In one embodiment, the processor is a set of general purpose processors or application specific integrated circuits that execute code of the applications 107 and similar functions of the sensor device 101. The functions of the sensor device 101 can be implemented in firmware or similar code. In other embodiments, the applications 107 can be specialized circuits that are hardwired.

In one embodiment, the processor 105 can execute a time application programming interface (API) 111. The time API 111 exposes the information obtained by the cellular receiver to the sensor device firmware or applications 107 running on top of it. Specifically, the time API 111 can provide the network tag to applications 107. These applications 107 have a need for network tagging the data and content that they generate. The applications 107 access the time API 111 at the time the data or content is being generated, and tag the content with the received network tag. This network tag can then be used to look up the actual time according to a world time standard. These sensor devices are typically utilized in a larger system.

Figure 1B:
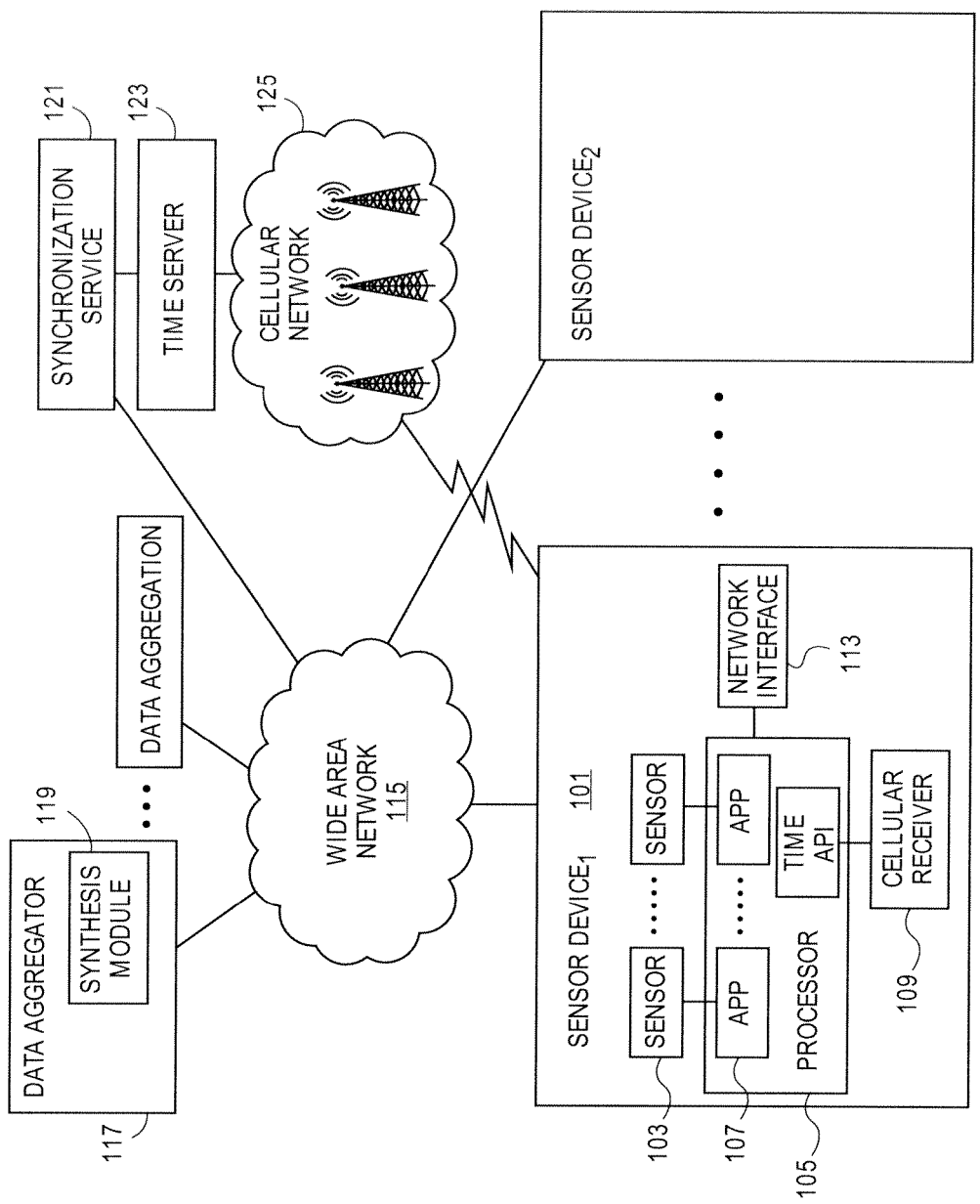
FIG. 1B is a diagram of one embodiment of an example architecture implementing a precise time tagging system.

FIG. 1B is a diagram of one embodiment of the system implementing the precision time tagging. In one embodiment, the system encompasses a set of sensor devices 101. A 'set,' as used herein is any positive whole number of items including one item. The sensor devices can be any type of electronic devices including a set of sensors 103 for collecting real-world data. Any type, number and configuration of sensors 103 can be present in the sensor devices 101. Any combination of sensor devices 101 can be deployed in any location, number, configuration or arrangement. Sensor devices 101 can be employed for any purpose, such as highway traffic monitoring, factory machinery status monitoring, energy reactor conditions monitoring, security systems and similar deployments. The sensor devices 101 can be any type of connected thing that can generate data or content, which will benefit from having accurate time information.

The sensor devices 101 can be connected via a network interface 113 to a wide area network 115 and via the cellular receive the cellular network 125. The network interface 113 can be any type of networking adapter including wired or wireless networking adaptors using any type of communication protocol. The sensor devices 101 can be connected through the wide area network 115 (such as the Internet) to a data aggregator 117 and/or a synchronization service 121. In other embodiments, the sensor devices 101 can store all collected data locally and do not have a network interface 113 to report data over a wide area network. These devices can be designed for lower cost or long term deployment where there are no available networks, such as sensors placed on animals for tracking. These devices can have data ports such as universal serial bus (USB) or similar ports to enable exporting of the collected data. In further embodiments, the network interface 113 can be a near field communication device or similar communication device that can connect to local devices rather than a wide area network to enable data transfer for the collected data. Data transferred via these local connections can subsequently be transferred to a data aggregator or similar system where the accurate times are correlated with the network tags of the collected data and content.

The data aggregator 117 can be any computing device that is accessible over the wide area network 115 that executes a synthesis module 119. The synthesis module 119 is software that synthesizes data and other content that have temporal and spatial relevance received from the set of sensors 101. For instance, a video-sharing website which can identify linkable video streams (taped and uploaded by the same or different users) based on their network tags (and in addition other contextual information, e.g., GPS location tag, user-generated text/event tags, etc.). It may further create a multi-angle video clip automatically and makes it available to all the users who shared the original video streams. The data aggregator can receive and store all or any subset of the sensor data generated by the sensor devices 101. The synthesis module 119 is connected with the synchronization service 121, which enables the synthesis module 119 to correlate the network tags with accurate time according to a world time standard.

The synchronization service 121 can be a synthesization-as-a-service cloud offering or similarly implemented service. In one embodiment, this service is an operator-hosted cloud service that provides absolute timestamps that is accurate time values according to a world time standard that correspond to the network tags of the data and content collected by the sensors 101 and the radio frames from which these network tags were derived from particular cell towers at the time the data and other contents were generated. The synchronization service 121 is a logical entity, meaning that physically the service could be offered in a distributed manner, to be accessible to sensor devices 101 at the closest distance possible. Its functions may also be integrated into cell towers for the best accessibility. In one embodiment, the functionality is further divided into a time server 123 that tracks the accurate time of the network tags as the radio frames are broadcast and the synchronization service provides an interface to data aggregators 117 for this data.

In other embodiments, the sensor devices 101 can communicate with the synchronization service to obtain the accurate times corresponding to the network tags to enable data and content correlation at the sensor device 101. This functionality can be implemented by the time API or similar component of the sensor device 101 that communicates with the synchronization service 121 through its network interface 113.

In a further embodiment, the time API 111 can also be responsible for reporting network tag information and similar information to other sensor over the network interface or through a similar communication mechanism to enable synchronization across the sensor devices 101.

Figure 2:
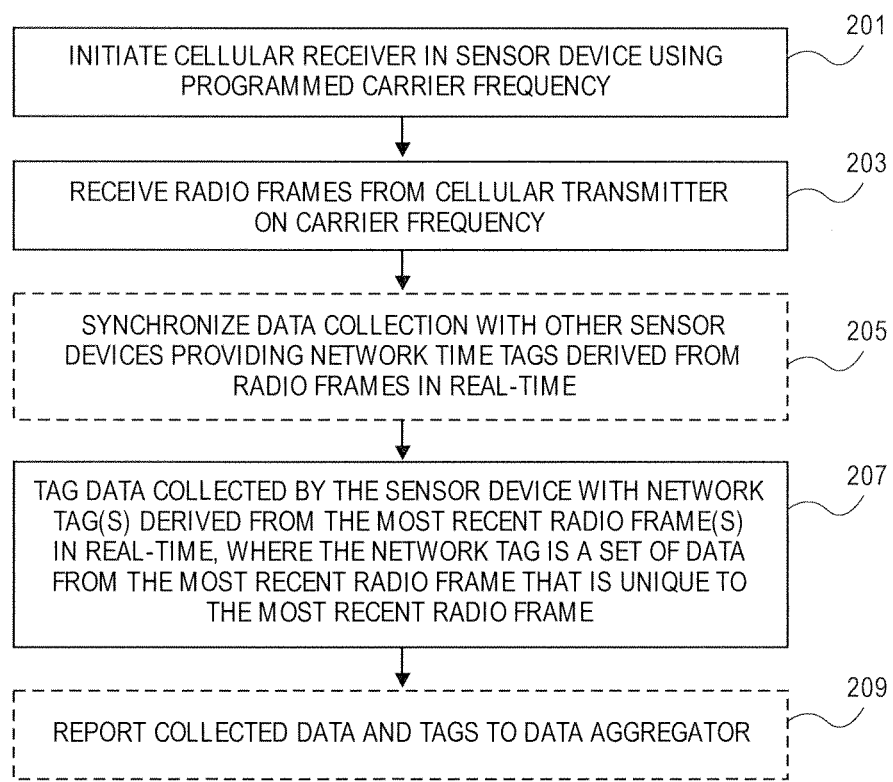
FIG. 2 is a flowchart of one embodiment of a process executed by a sensor device for precise time tagging.

FIG. 2 is a flowchart of one embodiment of the tagging process performed by the sensor device. In one embodiment, the process for network tagging is implemented by the sensor devices or a set of sensor devices. The sensor devices can initiate network tagging by initializing the cellular receiver using a pre-programmed carrier frequency (Block 201). A single carrier frequency or set of carrier frequencies can be programmed. A user can configure or the sensor device can detect the operable carrier frequency to receive the required radio frames. Most 2G/3G/4G devices need to synchronize to the physical-layer framing structure before any communications with the network can take place. They operate with carrier-provided SIM cards, which contain information about the band and carrier frequencies for a particular country or city. Hence they can easily achieve physical-layer synchronization. However, SIM cards are too expensive for low-cost sensors devices.

Physical-layer synchronization with the cellular network is achieved and maintained within a cellular receiver or modem chipset. For device sensors that only need to access the high-precision physical-layer information for generating network tags provided by a cellular network, and do not ever need to transmit any signal back to the network, only the receiver part of the modem chipset is needed.

A cellular receiver is much cheaper and also smaller in terms of chip area than a complete cellular modem. It is well suited for certain sensor device applications as far as cost, size, energy consumption and operation is concerned. In on embodiment, the cellular receiver on a sensor device can quickly tune to the right carrier frequency without the need to scan through a long list of frequencies. For a sensor device without a SIM card, synchronizing to an operator network is possible, but it has to scan through a number of carrier frequencies, typically in a raster step of 100 KHz, across a number of bands. This takes a long time and consumes higher battery, both being critical concerns especially for low-cost sensors.

A cellular network operator works with or exposes to sensor device manufacturers or original equipment manufacturers (OEMs) the necessary information to produce sensors with embedded cellular receivers that have the frequency band and carrier frequency information hardcoded. At startup time, or when roaming to a different region, instead of scanning through a long list of frequencies, the cellular receiver on a sensor device quickly tunes to the right frequency as pre-programmed, thus saving startup time and battery. The cellular receiver on a sensor device listens to the radio frames at the carrier frequency, and in real-time exposes through the time API the time-related information it hears, formulated as network tags—(a cellular identifier (cell-ID), (SFN, SubFN, SN)) pairs (Block 203. The cellular receiver exposes the physical-layer frame and slot numbers using one of its input/output (I/O) or the time API. The frame number may further include the super-frame number in the case of GSM.

Sensors/devices that have been deployed to work in collaboration use the obtained time-related info to synchronize with each other in real time (Block 205). In one embodiment, co-located sensors devices (i.e., listening to the same cell tower) synchronize by communicating to each other directly the network tags (i.e., (SFN, SubFN, SN)) heard from the cellular network. In another embodiment, sensors devices that are distributed over larger geographies (and hence listening to different cell towers) synchronize with the help of the carrier's the synchronization service cloud offering.

In one embodiment, the sensor device firmware or an application running on the sensor device tags the data or content it generates with the network tags—(cell-ID, (SFN, SubFN, SN)) pairs (Block 207). The firmware or application, with access to the high-precision network time info, tags the data or content it generates at the time it is generated. For text or image, it might be one single network tag. For audio or video, it could be a series of network tags, each associated with a particular position or frame in the content. The sensor device can report any data or content that is generated along with the associated network tags to a data aggregator or similar collection service for storage and further analysis or synthesis (Block 209). In other embodiments, the data is stored locally at the sensor device or on a local area network and can be synthesized at the local location.

Figure 3:
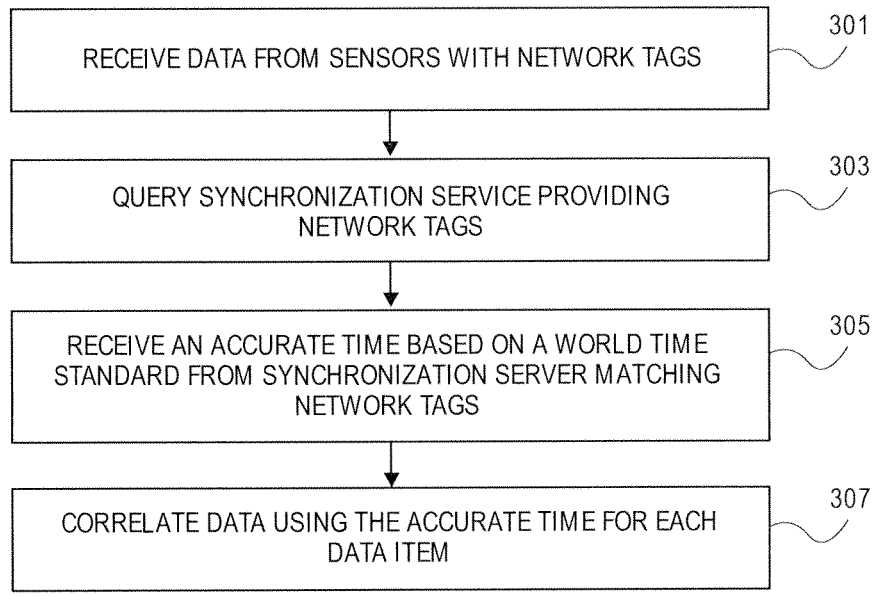
FIG. 3 is a flowchart of one embodiment of a process for data aggregation using the precise time tagging.

FIG. 3 is a diagram of one embodiment of a process for synthesis at a data aggregator or sensor device. When data is received from a sensor at the sensor device or after the data is reported to the data aggregator (Block 301), then synthesis of data and contents generated by multiple sensors devices is needed, and a content synthesis service interacts with the carrier's synchronization service cloud offering through the hypertext transfer protocol or similar communication protocol or API to obtain the accurate time correlated to a world time standard.

In one embodiment, the (cell-ID, (SFN, SubFN, SN)) pairs that are tagged on the received data and contents to be synthesized are sent to the synchronization service as a query (Block 303). The synchronization service looks up the accurate time and responds with the correlated high-precision accurate time value according to a world time standard, which is then received over the network at the requesting device (Block 305). The received accurate time can then be correlated with the network tags and the content and data can then be synthesized with other content and data having the same accurate time (Block 307).

Content synthesis services synthesize the contents generated by multiple sensors/devices based on the high-precision absolute timestamps. To give some examples, such content synthesis services may synthesize contents taken at the same time/location, such as (1) images, to create multi-angle, panorama or 360-degree views; (2) audios, to produce better audio recording that has higher fidelity or captures better sound-stage accuracy; and (3) videos, to generate multi-angle or 3D video streams.

Figure 4:
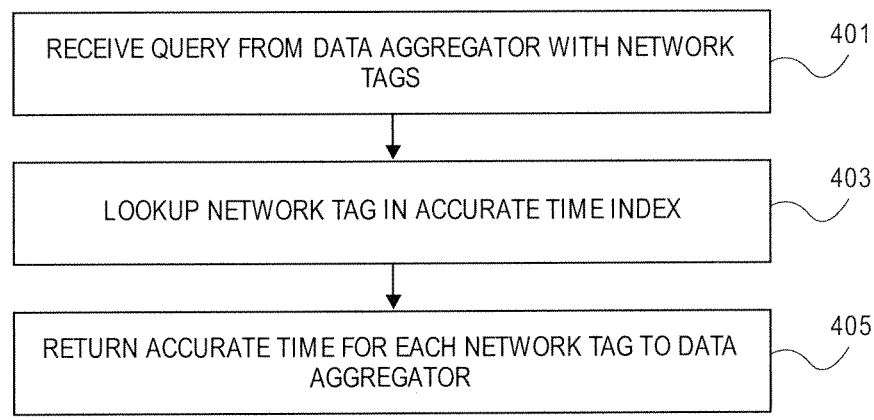
FIG. 4 is a flowchart of one embodiment of a process for time tag synchronization.

FIG. 4 is a flowchart of one embodiment of a process for data synchronization at the synchronization service. The synchronization service receives a query from a synchronization module of the data aggregator or the sensor device that includes a network tag or a set of network tags (Block 401). The synchronization services translates the (cell-ID, (SFN, SubFN, SN)) pairs to accurate time values based on a world time standard using a time server having access to the cellular carrier's infrastructure management and maintenance logs and records, taking into account the gaps between the clocks at different cell towers (physical-layer timing at different cells within the same operator's network oftentimes are not synchronized). This data can be compiled for fast lookup as an accurate time index (Block 403). In another embodiment, the (cell-ID, (SFN, SubFN, SN)) pairs that are tagged on a set of data or content are sent to the synchronization service in batch from the data aggregator or the sensor device. The synchronization service identifies the each of the pairs that are potentially synthesizable based on the accurate time corresponding to the network tags (i.e., the (cell-ID, (SFN, SubFN, SN)) pairs) plus the locations derived from the cell-IDs.

An operator may charge data aggregators and other applications for API access to the synchronization services with a range of charging models (e.g., per API call, per month unlimited, per month capped, etc.). This value comes from the fact that the operator owns and maintains the network infrastructure that provides the high-precision timestamps. An operator may charge or partner with sensor/device/chip manufacturers by providing frequency band and carrier frequency information about its network in various cities. This value also comes from the operator's ownership and deep knowledge of its network infrastructure. In the case where multiple operators provide synchronization services, the network infrastructure vendor may step up and charge for helping content data aggregation and synthesis services and similar applications to remove the discrepancies among accurate time values obtained from different operators.

The embodiments enable, at very low cost, various sensor devices to produce contents that are tagged with high-precision accurate time values, and thus enables those contents to be accurately synthesized when needed.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the sensor devices, synchronization and synthesis services may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a sensor device to associate data collected by the sensor device with an accurate time according to a world time standard without having to include a dedicated timing device within the sensor device, thereby reducing the cost and complexity of the sensor device, the method including a set of steps comprising:
    initiating a cellular receiver in the sensor device using a programmed carrier frequency;
    receiving at least one radio frame from a cellular transmitter on the carrier frequency; and
    tagging data collected by the sensor device with a network tag derived from a most recent radio frame of the at least one radio frame in real-time, the network tag including a set of data from the most recent radio frame that is unique to the most recent radio frame.

2. The method of claim 1, further comprising the step of:
    synchronizing data collection with other sensor devices by providing the network tag to each of the other sensor devices in real-time.

3. The method of claim 1, further comprising:
    reporting collected data and the network tag associated with the collected data to a data aggregator.

4. The method of claim 1, further comprising:
    querying a synchronization service using the network tag.

5. The method of claim 4, further comprising:
    receiving the accurate time based on a synchronization server matching the network tag.

6. The method of claim 5, further comprising:
    correlating the collected data with the accurate time.

7. The method of claim 1, wherein the set of data include any two of a cellular identifier (cell ID), a System Frame Number (SFN), a Sub-Frame Number (SubFN), and a Slot Number (SN).

8. A sensor device implementing a process to associate data collected by the sensor device with an accurate time according to a world time standard without having to include a dedicated timing device within the sensor device, thereby reducing the cost and complexity of the sensor device, the sensor device comprising:
    a sensor to collect data;
    a cellular receiver configured to use a programmed carrier frequency and to receive at least one radio frame from a cellular transmitter on the carrier frequency; and
    a processor coupled to the sensor and the cellular receiver, the processor configured to tag data collected by the sensor with a network tag derived from a most recent radio frame of the at least one radio frame in real-time, the network tag including a set of data from the most recent radio frame that is unique to the most recent radio frame.

9. The sensor device of claim 8, further comprising:
    a network interface coupled to the processor, the network interface to communicate over a network,
    wherein the processor is further configured to synchronize data collection with other sensor devices by providing the network tag to each of the other sensor devices in real-time via a network interface.

10. The sensor device of claim 8, wherein the processor is further configured to report collected data and the network tag associated with the collected data to a data aggregator.

11. The sensor device of claim 8, wherein the processor is further configured to query a synchronization service using the network tag.

12. The sensor device of claim 11, wherein the processor is further configured to receive the accurate time based on a synchronization server matching the network tag.

13. The sensor device of claim 12, wherein the processor is further configured to correlate the collected data with the accurate time.

14. The sensor device of claim 8, wherein the set of data include any two of a cellular identifier (cell ID), a System Frame Number (SFN), a Sub-Frame Number (SubFN), and a Slot Number (SN).

* * * * *